(12) United States Patent
Fisher et al.

(10) Patent No.: US 8,916,497 B2
(45) Date of Patent: Dec. 23, 2014

(54) THERMALLY-RESPONSIVE RECORD MATERIAL

(71) Applicants: Mark Robert Fisher, Appleton, WI (US); Fadi Selim Chakar, Appleton, WI (US); Yves Defrenne, Appleton, WI (US)

(72) Inventors: Mark Robert Fisher, Appleton, WI (US); Fadi Selim Chakar, Appleton, WI (US); Yves Defrenne, Appleton, WI (US)

(73) Assignee: Appvion, Inc., Appleton, WI (US)

( * ) Notice: Subject to any disclaimer, the term of this patent is extended or adjusted under 35 U.S.C. 154(b) by 0 days.

(21) Appl. No.: 14/264,516

(22) Filed: Apr. 29, 2014

(65) Prior Publication Data

US 2014/0231529 A1 Aug. 21, 2014

Related U.S. Application Data

(63) Continuation-in-part of application No. 13/803,824, filed on Mar. 14, 2013.

(51) Int. Cl.
*B41M 5/327* (2006.01)
*B41M 5/333* (2006.01)
*B41M 5/337* (2006.01)
*G06K 19/02* (2006.01)
*G06K 19/06* (2006.01)
*A47B 47/02* (2006.01)
*F16B 12/40* (2006.01)

(52) U.S. Cl.
CPC .............. *G06K 19/02* (2013.01); *B41M 5/3336* (2013.01); *B41M 5/3275* (2013.01); *G06K 19/0614* (2013.01); *B41M 5/3375* (2013.01); *A47B 47/021* (2013.01); *F16B 12/40* (2013.01)
USPC ............ 503/209; 503/216; 503/217; 503/221

(58) Field of Classification Search
CPC . B41M 5/3275; B41M 5/3336; B41M 5/3375
USPC .................. 503/209, 216, 217, 221
See application file for complete search history.

(56) References Cited

FOREIGN PATENT DOCUMENTS

JP 06-191154 * 7/1994

* cited by examiner

*Primary Examiner* — Bruce H Hess
(74) *Attorney, Agent, or Firm* — Benjamin Mieliulis

(57) ABSTRACT

The invention describes a thermally-responsive record material substantially free of aromatic isocyanate. The record material comprises a support having provided thereon a heat-sensitive composition comprising a substantially colorless dye precursor comprising a fluoran; and a developer material selected from the group consisting of 4,4'-diaminodiphenylsulfone and 3,3'-diaminodiphenylsulfone in combination with N-[(butylamino)carbonyl]-4-methylbenzene sulfonamide, which upon being heated react with said dye precursor to develop color, and including a binder material.

15 Claims, No Drawings

THERMALLY-RESPONSIVE RECORD MATERIAL

CROSS-REFERENCE TO RELATED APPLICATIONS

This application is a continuation-in-part of Chakar, Ser. No. 12/803,824 filed Mar. 14, 2013 now pending.

FIELD OF INVENTION

This invention relates to a thermally-responsive record material. It more particularly relates to such record material of the type in the form of sheets coated with color-forming systems comprising chromogenic material (electron-donating dye precursors) and typically acidic color developer material. This invention particularly concerns a thermally-responsive record material capable of forming a substantially non-reversible image resistant to fade or erasure and useful for producing dark images or functional bar codes. The invention teaches an improved thermally-sensitive record material which when imaged exhibit useful image properties.

DESCRIPTION OF THE RELATED ART

Thermally-responsive record material systems are well known in the art and are described in many patents, for example. U.S. Pat. No. 3,539,375 Baum; U.S. Pat. No. 3,674,535 Blose et al., U.S. Pat. No. 3,746,675 Blose et al., U.S. Pat. No. 4,151,748 Baum; U.S. Pat. No. 4,181,771 Hanson et al.; U.S. Pat. No. 4,246,318 Baum, and U.S. Pat. No. 4,470,057 Glanz which are incorporated herein by reference. In these systems, basic colorless or lightly colored chromogenic material and acidic color developer material are contained in a coating on a substrate which, when heated to a suitable temperature, melts or softens to permit said materials to react, thereby producing a colored mark.

Thermally-sensitive record materials have characteristic thermal response, desirably producing a colored image of sufficient intensity upon selective thermal exposure.

A need exists in the industry for thermally responsive record materials that are considered more environmentally friendly. A thermally-imaging formulation that can produce an image when heated to a suitable temperature and be more acceptable in the marketplace from environmental or safety considerations would be useful commercially.

Thermally-responsive record materials are utilized in diverse application including for labeling, facsimile, point of sale printing, printing of tags, pressure sensitive labels.

Kawakami, U.S. Pat. No. 5,464,804 teaches a thermal recording material wherein colorless dye is combined with an isocyanate and an amino compound. Similarly Shimura et al., U.S. Pat. No. 5,079,211 teaches forming a heat sensitive recording material by combining a fluoran compound with an aromatic isocyanate and an imino compound having at least one >C=NH which reacts with the isocyanate compound upon application of heat to form a color.

Shimura's isocyanate compounds are aromatic or heterocyclic isocyanate compounds such as also disclosed in Kabashima et al., U.S. Pat. No. 4,521,793. An aromatic isocyanate is reached with an imino compound having at least one >C=NH group to effect color formation. In each case the isocyanate is reacted with the imino compound to form a complex that reacts with the dye.

The present invention is a departure from preceding art by foregoing the use of isocyanate materials. Isocyanates are disfavored in some environments and can even be hazardous. A thermally imaging system substantially-free of isocyanate would be commercially useful. Additionally the present invention advantageously provides an alternative to the typical phenolic developer common employed.

DETAILED DESCRIPTION

A drawback of certain thermally-responsive record materials limiting utilization in certain environments and applications has been the undesirable tendency of thermally-responsive record material upon forming an image to not retain that image in its original integrity over time when the thermally-responsive record material is environmentally challenged such as in high heat (80 deg. C. for 24 hours), handled or exposed to common liquids or oils or plasticizers such as found in skin oil, contacted with plastic food wrap or cooking oils or solvents such as common carbonless paper solvents.

Bar codes provide a convenient means for computerized inventory or goods handling and tracking. To function properly, it is necessary that the bar code have high print contrast signal, and that the thermally-responsive material on which the bar code is imaged resist unwanted bar width growth after imaging. The characters or bars must not only be intensely imaged, but must be sharp, and unbroken or free of pin holes. It is also necessary that when read by a scanner that a high percentage of scans result in successful decoding of the information in the bar code. The percentage of successful decodes of the bar code information must be maintained at a high value for the thermally-responsive record material to gain wide commercial acceptance for use in bar coding applications. Bar codes formed with the thermally responsive record material of the invention have a high level of successful decodes.

Print contrast signal relates to image intensity. Bar width growth relates to imaged bar dimensional stability and character sharpness. Percent decode relates to image integrity. Background contrast maintained at a high level is desirable. Difficulties have often been encountered attempting to bring together a confluence of these characteristics simultaneously in one coating formulation.

The present invention teaches an improved thermally-responsive record material having an intense image and resistant to erasure in high temperature environments. Bar codes found from the thermally-responsive record material of the invention having an ANSI grading of C, or even B or better are achievable.

The thermally-responsive record material and bar code of the invention has the unexpected and remarkable properties of being capable of forming a non-reversible high density bar code image upon selective thermal contact and of retaining that bar code image over time when subjected to common external environmental challenges.

The invention describes a thermally-responsive record material substantially free of isocyanate in the color forming, reaction, whether aromatic or heterocyclic isocyanate. The record material comprises a support having provided thereon a heat-sensitive composition comprising a substantially colorless dye precursor comprising a fluoran; and a developer material, preferably the developer material is selected from the group consisting of 4,4'-diaminodiphenylsulfone and 3,3'-diaminodiphenylsulfone in combination with N-[(butylamino) carbonyl]-4-methylbenzenesulfonaide, which upon being heated reacts with said dye precursor to develop color, and including a binder material. Optionally, modifier compound can be employed. Surprisingly, addition of modifier is not necessary for a functional system according to the invention. The modifier compound can be preferably selected from the group consisting of a fatty acid amide, 1,2-diphenoxy ethane, dimethyl diphenoxy ethane, and dimethyl phthalate.

The invention teaches a thermally-responsive record material, substantially free of aromatic isocyanate, the record material comprising a support having provided thereon a heat-sensitive composition comprising;

a substantially colorless dye precursor comprising a fluoran;

a developer material selected from the group consisting of 4,4'-diaminodiphenylsulfone and 3,3'-diaminodiphenysulfone, in combination with N-[(butylamino)carbonyl]-4-methlbenzenesulfonamide which upon being heated react with said dye precursor to develop color;

and a binder material.

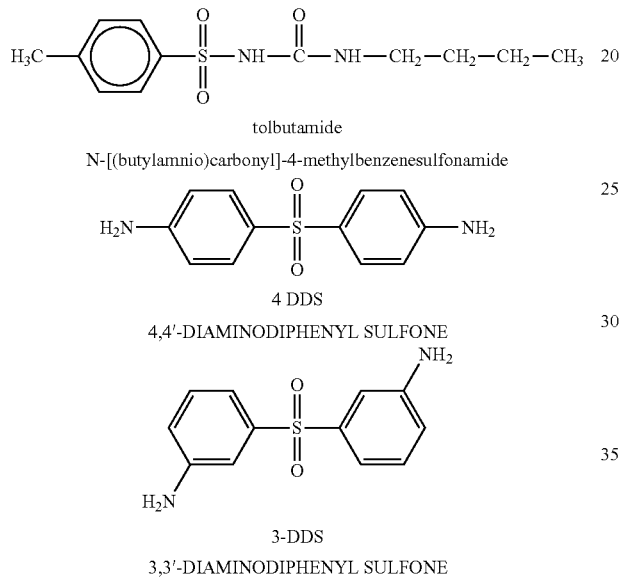

tolbutamide
N-[(butylamnio)carbonyl]-4-methylbenzenesulfonamide

4 DDS
4,4'-DIAMINODIPHENYL SULFONE

3-DDS
3,3'-DIAMINODIPHENYL SULFONE

Surprisingly, the combination of the invention yields a more intense and stable image as compared to a system with either one of the sulfones or sulfonamide by itself. The combination yield a system resistant to erasure when subjected to environmental challenges such as an 80° C. oven for 24 hours.

In a further embodiment the invention comprises a thermally-responsive record material, wherein the substantially colorless dye precursor comprises a fluoran compound of the formula wherein $R_1$ is hydrogen or alkyl
wherein $R_2$ is hydrogen or alkaryl;
wherein $R_3$ is aryl when $R_2$ is hydrogen, or alkaryl when $R_2$ is alkaryl;

$R_4$ and $R_5$ are each independently selected from alkyl, alkayl; or $R_4$ and $R_5$ form a four carbon ring pyrrolidine structure.

In a yet further embodiment, in the thermally-responsive record material described the fluoran is selected from the group consisting of:

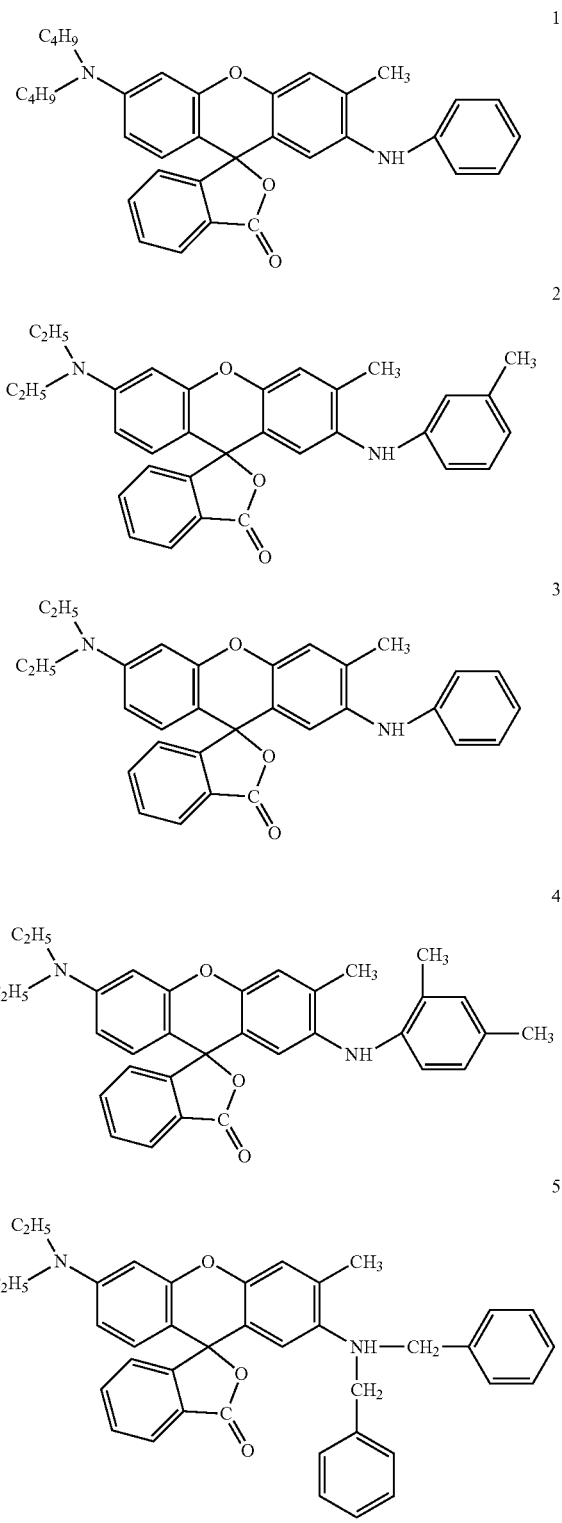

-continued

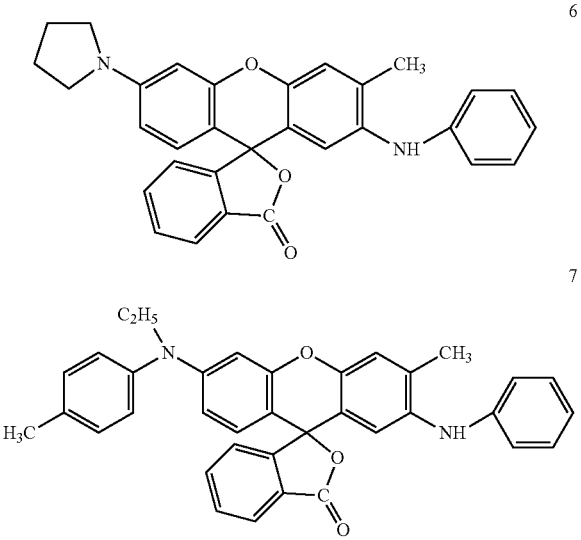

For convenience, the above dye precursors are referred to herein as the respective "dye," by the structure number (e.g. "dye 1," "dye 2," "dye 3," "dye 4," "dye 5," "dye 6," and "dye 7."

In a further embodiment, in the thermally-responsive record material described, the dye precourser can comprise a fluoran described above, or even dye precursors such as 2-chloro-6-(diethylamino)-fluoran; 6-(diethylamino)-3-oxo-spiro[isobenzofuran-1(3H), 9'-[9H]xanthene]-2'-carboxylic acid ethyl ester; 3-(diethylamino)-7-(dibenzylamino)fluoran; 7-[4-(diethylamino)-2-ethoxyphenyl]-7-(1-ethyl-2-methyl-1H-indol-3-yl)furo[3,4-b]pyridin-5(7H)-one; 4,5,6,7-tetrachloro-3,3-bis[2-[4-dimethylamino]phenyl]-2-(4-methoxyphenyl)ethenyl]-1(3H)isobenzofuranone; and crystal violet lactone.

The record material according to the invention has a non-reversible image in that it is non-reversible under the action of heat. The coating of the record material of the invention is basically a dewatered solid at ambient temperature.

The color-forming system of the record material of this invention comprises the electron donating dye precursors, also known as chromogenic material, in its substantially colorless state together with an acidic developer material. The color-forming system relies upon melting, softening, or subliming one or more of the components to achieve reactive, color-producing contact with the chromogen. Substantially colorless for purposes of the invention is understood to mean colorless or lightly or faintly colored.

The record material includes a substrate or support material which is generally in sheet form. For purposes of this invention, sheets can be referred to as support members and are understood to also mean webs, ribbons, tapes, belts, films, cards and the like. Sheets denote articles having two large surface dimensions and a comparative small thickness dimension. The substrate or support material can be opaque, transparent or translucent and could, itself, be colored or not. The material can be fibrous including, for example, paper and filamentous synthetic materials. It can be a film including, for example, cellophane and synthetic polymeric sheets cast, extruded, or otherwise formed. The invention resides in the color-forming composition coated on the substrate. The kind or type of substrate material is not critical. In some embodiments neutral sized base paper is a preferred substrate.

The components of the heat sensitive coating are in substantially contiguous relationship, substantially homogeneously distributed throughout the coated layer or layers deposited on the substrate. For purposes of this invention the term substantially contiguous is understood to mean that the color-forming components are positioned in sufficient proximity such that upon melting, softening or subliming one or more of the components, a reactive color-forming contact between the components is achieved. As is readily apparent to the person of ordinary skill in this art, these reactive components accordingly can be in the same coated layer or layers, or individual components positioned in separate layers using multiple layers. In other words, one component can be positioned in the first layer, and developer or modifier or sensitizer components positioned in a subsequent layer or layers. All such arrangements are understood herein as being substantially contiguous.

The developer to dye precursor ratio by weight is maintained, at from 1:1 to about 4:1, or even from 0.1:1 to about 3:1, or even from 0.5:1 to about 2.5:1 or even from about 0.5:1 to about 5:1. Preferably the developer to dye precursor ratio is from about 1:1 to about 3:1. The modifier to dye precursor ratio by weight is preferably maintained at greater than 1:1, or even from 0.2:1 to about 2.5:1, or even from about 0.1:1 to about 3:1, or even from 0.1:1 to about 4:1.

In manufacturing the record material, a coating composition is prepared which includes a fine dispersion of the components of the color-forming system, and binder material, preferably polymeric binder such as polyvinyl alcohol. The composition of the invention can optionally include or be free of pigments including clays and fillers. Preferably, pigments, if included, are maintained at less than 13%, or even less than 20%, or even less than 30%, by weight of the heat sensitive coating composition of the invention.

The heat-sensitive coating composition can additionally contain pigments, such as clay, talc, silicon dioxide, aluminum hydroxide, calcined kaolin clay and calcium carbonate, and urea-formaldehyde resin pigments at from 0 to 10% or even from 0 to 20% or even 0 to 30% by weight of the heat-sensitive coating. Other optional materials include natural waxes, Carnauba wax, synthetic waxes, lubricants such as zinc stearate; wetting agents; defoamers, modifiers and antioxidants. The modifier typically does not impart any image on its own but as a relatively low melt point solid, acts as a solvent to facilitate reaction between the mark-forming components of the color-forming system. Optionally the thermally-sensitive record material can be top coated with a polymeric material forming a top coating. Materials such as polyvinyl alcohol or any of various binder materials can also be used for this purpose.

The color-forming system components are substantially insoluble in the dispersion vehicle (preferably water) and are ground to an individual average particle size of less than 10 microns, preferably less than 3 microns. The polymeric binder material is substantially vehicle soluble although latexes are also eligible in some instances. Preferred water soluble binders, which can also be used as topcoats, include polyvinyl alcohol, hydroxy ethylcellulose, methylcellulose, methyl-hydroxypropylcellulose, starch, modified starches, gelatin and the like. Eligible latex materials for the binder and/or topcoat include polyacrylates, styrene-butadiene-rubber latexes, polyvinylacetates, polystyrene, and the like. The polymeric binder is used to protect the coated materials from brushing and handling forces occasioned by storage and use of thermal sheets. Binder should be present in an amount to afford such protection and in an amount less than will interfere with achieving reactive contact between color-forming reactive materials.

Coating weights can effectively be from about 0.5 or even from 1, to 8 or even about 9 grams per square meter (gsm) or even from 0.5 to about 6 gsm and preferably about 1 to about 6 gsm and more preferably from 1 to 3 gsm. The practical amount of color-forming materials is controlled by economic considerations, functional parameters and desired handling characteristics of the coated sheets.

The thermally response record material of the invention is particularly advantageous for bar codes. Bar codes provide a convenient means for computerized inventory or goods handling and tracking. To function properly, it is necessary that the bar code have high print contrast signal, and that the thermally-responsive material on which the bar code is imaged resist unwanted bar width growth after imaging. The characters or bars must not only be intensely imaged, but must be sharp, and unbroken or free of pin holes. It is also necessary that when read by a scanner that a high percentage of scans result in successful decoding of the information in the bar code. The percentage of successful decodes of the bar code information must be maintained at a high value for the thermally-responsive record material to gain wide commercial acceptance for use in bar coding applications.

To form a bar code, the heat sensitive layer on the support is imaged by selective application of heat in the pattern of a bar code. The thermally responsive record material composition described herein enables imaging on the record material of an improved bar code of any type, including one and two dimension pattern bar codes. Bar codes are well known and typically comprise a plurality of uniformly spaced apart parallel vertical lines, often of differing thicknesses forming a row extending from a common horizontal axis. The horizontal axis is generally not shown but is a convenient reference point for descriptive purposes. The spaced apart parallel neutral lines are arranged in a row. Bar codes are a machine readable representation of data and can be one dimension or two dimension patterns, graphics, or other imaged patterns relying on interpretive software to decode the bar code when scanned. More recently, 2D matrix bar codes such as Aztec code, QR code (Toyota), Data Matrix (Microscan Systems) and other bar code formats, including circular such as Maxicode or shot code are commonly used. All such codes are contemplated by the term bar code.

The following examples are given to illustrate some of the features of the present invention and should not be considered as limiting. In these examples all parts or proportions are by weight and all measurements are in the metric system, unless otherwise stated.

In all examples illustrating the present invention a dispersion of a particular system component can be prepared by milling the component in an aqueous solution of the binder until a particle size of less than 10 microns is achieved. The milling was accomplished in an attritor or other suitable milling device. The desired average particle size was less than 3 microns in each dispersion.

The thermally-responsive sheets were made by making separate dispersions of chromogenic material, modifier material, and developer material. The dispersions are mixed in the desired ratios and applied to a support with a wire wound rod and dried. Other materials such as fillers, antioxidants, lubricants and waxes can be added if desired. The sheets may be calendered to improve smoothness.

The abbreviations and dye precursor numbers correspond to the following materials:

| | |
|---|---|
| DME | dimethyldiphenoxyethane |
| DPE | 1,2-diphenoxyethane |
| DMT | dimethyl phthalate |
| 3-DDS | 3,3'-diaminodiphenylsufone |
| 4-DDS | 4,4'-diaminodiphenylsulfone |
| Dye, Formula # | |
| Dye 1 | 3-diethylamino-6-methyl1-7-(2',4'dimethyl aniline) fluoran |
| Dye 2 | 3-dibutylamino-6-methyl-7-anilino fluoran |
| Dye 3 | 3-diethylamino-6-methyl-7-(3'-methylanilino) fluoran |
| Dye 4 | 3-diethylamino-6-methyl-7-anilino fluoran |
| Dye 5 | 3-(N-ethyl-N-p-tolylamino)-6-methyl-y-anilino fluoran |
| Dye 6 | 3-pyrrolidino-6-methyl-7-anilino fluoran |
| Dye 7 | 3-diethylamino-7-(dibenzylamino) fluoran |
| Selvol 125, Sekisui Chemical Co., Ltd., Tokyo, Japan | Polyvinyl alcohol |

Dispersion A—Chromogenic Material

| | |
|---|---|
| Chromogenic Material | 30.0 |
| Binder, 20% solution of Polyvinyl alcohol in water | 25.0 |
| Defoaming and dispersing agents | 0.4 |
| Water | 44.6 |

Dispersion A1—Chromogenic Material is ODB-2

3-Diethylamino-6-methyl-7-anilinofluoran

Dispersion B—Developer Material

| | |
|---|---|
| Acidic Material | 38.0 |
| Binder, 20% solution of Polyvinyl alcohol in water | 18.0 |
| Defoaming and dispersing agents | 0.4 |
| Water | 43.6 |

Dispersion B1—Developer Material is 4-DDS 4-4'-Diaminodiphenyl sulfone

Dispersion B2—Developer Material is Tolbutamide

N-[(butylamino)carbonyl]-4-methylbenzenesulfonamide

Dispersion B3—Developer Material is 3-DDS 3-3'-Diaminodiphenyl sulfone

| Coating Formulation 1 | Parts |
|---|---|
| Dispersion A (Chromogenic) | 20.0 |
| Dispersion B (developer) | 40.0 |
| Binder, 10% solution of polyvinylalcohol in water | 25.0 |
| Filler slurry, 30% in water | 15.0 |

EXAMPLE 1

| Coating Formulation 1 Using | |
|---|---|
| Dispersion B1 | 40 parts |
| Dispersion B2 | 0 parts |

EXAMPLE 2

| Coating Formulation 1 Using | |
|---|---|
| Dispersion B1 | 36 parts |
| Dispersion B2 | 4 parts |

EXAMPLE 3

| Coating Formulation 1 Using | |
|---|---|
| Dispersion B1 | 30 parts |
| Dispersion B2 | 10 parts |

EXAMPLE 4

| Coating Formulation 1 Using | |
|---|---|
| Dispersion B1 | 20 parts |
| Dispersion B2 | 20 parts |

EXAMPLE 5

| Coating Formulation 1 Using | |
|---|---|
| Dispersion B1 | 10 parts |
| Dispersion B2 | 30 parts |

EXAMPLE 6

| Coating Formulation 1 Using | |
|---|---|
| Dispersion B1 | 4 parts |
| Dispersion B2 | 36 parts |

EXAMPLE 7

| Coating Formulation 1 Using | |
|---|---|
| Dispersion B1 | 0 parts |
| Dispersion B2 | 40 parts |

EXAMPLE 8

| Coating Formulation 1 Using | |
|---|---|
| Dispersion B3 | 40 parts |
| Dispersion B2 | 0 parts |

EXAMPLE 9

| Coating Formulation 1 Using | |
|---|---|
| Dispersion B3 | 36 parts |
| Dispersion B2 | 4 parts |

EXAMPLE 10

| Coating Formulation 1 Using | |
|---|---|
| Dispersion B3 | 30 parts |
| Dispersion B2 | 10 parts |

EXAMPLE 11

| Coating Formulation 1 Using | |
|---|---|
| Dispersion B3 | 20 parts |
| Dispersion B2 | 20 parts |

EXAMPLE 12

| Coating Formulation 1 Using | |
|---|---|
| Dispersion B3 | 10 parts |
| Dispersion B2 | 30 parts |

EXAMPLE 13

| Coating Formulation 1 Using | |
|---|---|
| Dispersion B3 | 4 parts |
| Dispersion B2 | 36 parts |

The examples were coated @ 2.0 gm/m$^2$. The examples were imaged on Atlantec model 400 @ 16.0 mj/mm$^2$ (16.0 millijoules/square millimeter)

The solid block optical density was measured using a GRETAG densitometer. The results are in the following Table:

TABLE 1

The amount of Tolbutamide or a percent of the total combination of Tolbutamide and DDS developer together is usefully advantageous at from 10% to 90%; and especially from 25% to 75%; and even from 25% to 50%.

| Sample | Density Initial | Ratio DDS/Tolbutamide |
|---|---|---|
| 1 | 0.34 | 100/0 |
| 2 | 0.68 | 90/10 |
| 3 | 0.92 | 75/25 |
| 4 | 1.16 | 50/50 |
| 5 | 1.13 | 25/75 |

TABLE 1-continued

The amount of Tolbutamide or a percent of the total combination of Tolbutamide and DDS developer together is usefully advantageous at from 10% to 90%; and especially from 25% to 75%; and even from 25% to 50%.

| Sample | Density Initial | Ratio DDS/Tolbutamide |
|---|---|---|
| 6 | 1.07 | 10/90 |
| 7 | 1.02 | 0/100 |
| 8 | 0.3 | 100/0 |
| 9 | 0.62 | 90/10 |
| 10 | 0.91 | 75/25 |
| 11 | 1.08 | 50/50 |
| 12 | 1.05 | 25/75 |
| 13 | 1.03 | 10/90 |

Note the surprising intensity with the combination of both developers. The intensity improvement surprisingly maximizes at a ratio close to 50:50 of both developers.

The imaged samples were then exposed to 40° C./90% RH (relative humidity) condition for 24 hrs to check image stability. This is done by recording the final intensity after exposure and comparing the value to the initial in order to calculate the percentage of image retained. The results are recorded in table 2.

TABLE 2

| Sample | Density Initial | Final | % Remain |
|---|---|---|---|
| 1 | 0.34 | 0.11 | 32% |
| 2 | 0.68 | 0.23 | 34% |
| 3 | 0.92 | 0.66 | 72% |
| 4 | 1.16 | 1.07 | 92% |
| 5 | 1.13 | 0.78 | 69% |
| 6 | 1.07 | 0.69 | 64% |
| 7 | 1.02 | 0.62 | 61% |
| 8 | 0.3 | 0.11 | 37% |
| 9 | 0.62 | 0.28 | 45% |
| 10 | 0.91 | 0.5 | 55% |
| 11 | 1.08 | 0.74 | 69% |
| 12 | 1.05 | 0.66 | 63% |
| 13 | 1.03 | 0.62 | 60% |

The results from table 2 show that the combination of both developers improved the 40° C./90% RH image retention, with the maximum benefit being close to a 50:50 ratio of both developers.

A second set of samples were imaged and exposed to 80° C. oven condition for 24 hours to check image stability. This is done by recording the final intensity after exposure and comparing the value to the initial in order to calculate the percentage of image retained. The results are recorded in table 3.

TABLE 3

| Sample | Density Initial | Final | % Remain |
|---|---|---|---|
| 1 | 0.36 | 0.11 | 31% |
| 2 | 0.67 | 0.35 | 52% |
| 3 | 0.9 | 0.83 | 92% |
| 4 | 1.17 | 1.13 | 97% |
| 5 | 1.13 | 1.05 | 93% |
| 6 | 1.05 | 0.86 | 82% |
| 7 | 1.00 | 0.27 | 27% |
| 8 | 0.34 | 0.11 | 32% |
| 9 | 0.61 | 0.32 | 52% |
| 10 | 0.93 | 0.78 | 84% |
| 11 | 1.09 | 0.98 | 90% |
| 12 | 1.06 | 0.83 | 78% |
| 13 | 1.02 | 0.68 | 67% |

Thermal systems according to the invention are expected to have an ANSI grade of at least C, and even grade B or better.

The results from table 3 shows a similar trend to the 40° C./90% RH results in that the combination of both developers improved the image retention, with the maximum benefit being close to a 50:50 ratio of both developers.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Uses of singular terms such as "a," "an," are intended to cover both the singular and the plural, unless otherwise indicated herein or clearly contradicted by context. The terms "comprising," "having," "including," and "containing" are to be construed as open-ended terms. All references, including publications, patent applications, and patents, cited herein are hereby incorporated by reference. Any description of certain embodiments as "preferred" embodiments, and other recitation of embodiments, features, or ranges as being preferred, or suggestion that such are preferred, is not deemed to be limiting. The invention is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims.

What is claimed is:

1. A thermally-responsive record material, substantially free of aromatic isocyanate, the record material comprising a support having provided thereon a heat-sensitive composition comprising:
 a substantially colorless dye precursor;
 a developer material selected from the group consisting of 4,4'-diaminodiphenylsulfone and 3,3'-diaminodiphenylsulfone;
 in combination with N-[(butylamino)carbonyl]-4-methylbenzenesulfonamide;
 which upon being heated react with said dye precursor to develop color;
 and a binder material.

2. The thermally-responsive record material according to claim 1, wherein the substantially colorless dye precursor comprises a fluoran compound of the formula

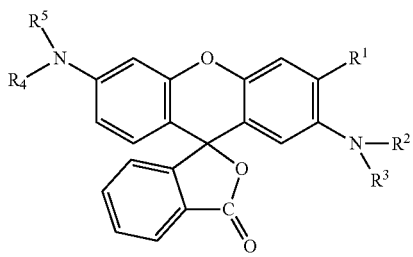

wherein R₁ is hydrogen or alkyl
wherein R₂ is hydrogen or alkaryl;
wherein R₃ is aryl when R₂ is hydrogen, or alkaryl when R₂ is alkaryl;
R₄ and R₅ are each independently selected from alkyl, aralkyl; or R₄ and R₅ form a four carbon ring pyrrolidine structure.

3. The thermally-responsive record material according to claim 2 wherein the fluoran is selected from the group consisting of:

1
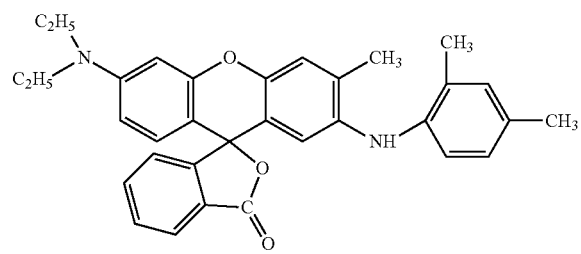

2
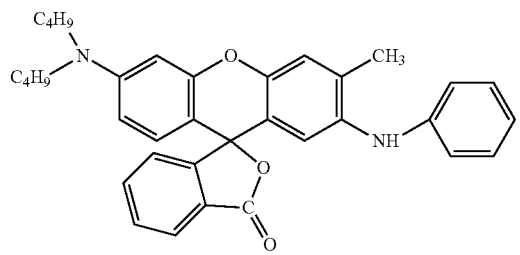

3
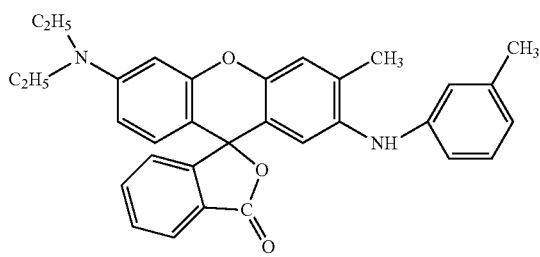

4
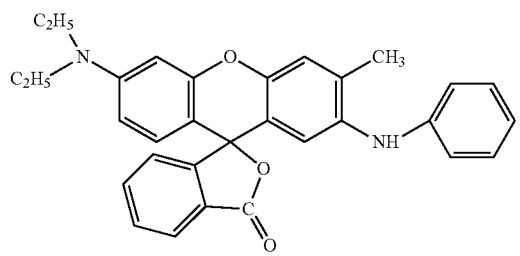

5
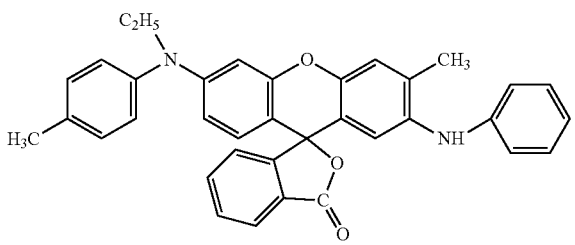

6
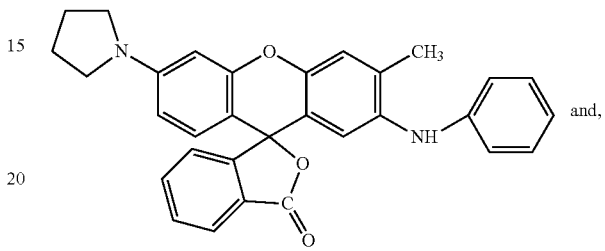

7
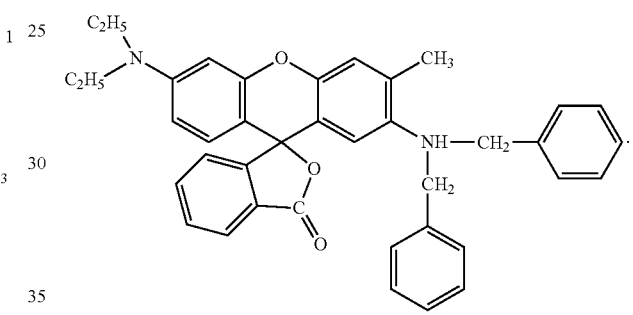

4. The thermally-responsive record material according to claim 1 wherein the heat sensitive composition is applied onto the support at from 0.5 to 8 gsm.

5. The thermally-responsive record material according to claim 1 wherein the amount of the N-[(butylamino)carbonyl]-4-metaylbenzenesulfoinamide is from 10% to 90% by weight of the combined weight of the sulfonamide and the developer material.

6. The thermally-responsive record material according to claim 1 having an ANSI grade of B or better.

7. The thermally-responsive record material according to claim 1 wherein the record material includes in addition a polymeric top coat.

8. The thermally-responsive record material according to claim 1 wherein the substantially colorless dye precursor selected from the group consisting of:
2-chloro-6-(diethylamino)-fluoran; 6-(diethylamino)-3-oxo-spiro[isobenzofuran-1(3H), 9'-[9H]xanthene]-2'-carboxylic acid ethyl ester; 3-(diethylamino)-7-(dibenzylamino)fluoran; 7-[4-(diethylamino)-2-ethoxyphenyl]-7-(1-ethyl-2-methyl-1H-indol-3-yl)furo[3,4-b]pyridin-5(7H)-one; 4,5,6,7-tetrachloro-3,3-bis[2-[4-dimethylamino]phenyl]-2-(4-methoxyphenyl) ethenyl]-1(3H)isobenzofuranone; and crystal violet lactone.

9. The thermally response record material according to claim 1 wherein the ratio by weight of developer and sulfonamide together to dye precursor is from 0.5:1 to 5:1.

10. The thermally responsive record material according to claim 1 comprising in addition a polymeric top coat over the heat sensitive composition.

11. The improved bar code according to claim 10 having an ANSI grading of C or better.

12. The improved bar code according to claim 10 wherein the developer is selected from 4,4'-diaminodiphenylsulfone and 3,3'-diaminodiphenylsulfone, and the dye precursor is selected from group consisting of:
- 3-diethylamino-6-methyl1-7-(2',4'dimethyl aniline) fluoran,
- 3-dibutylamino-6-methyl-7-anilino fluoran,
- 3-diethylamino-6-methyl-7-(3'-methylanilino) fluoran,
- 3-diethylamino-6-methyl-7-anilinofluoran,
- 3-pyrrolidino-6-methyl-7-anilino fluoran,
- 3-diethylamino-7-(dibenzylamino) fluoran,
- 2-chloro-6-(diethylamino)-fluoran,
- 6-(diethylamino)-3-oxo-spiro[isobenzofuran-1(3H), 9'-[9H]xanthene]-2'-carboxylic acid ethyl ester,
- 3-(diethylamino)-7-(dibenzylamino)fluoran,
- 7-[4-(diethylamino)-2-ethoxyphenyl]-7-(1-ethyl-2-methyl-1H-indol-3-yl) furo[3,4-b]pyridin-5(7H)-one, and
- 4,5,6,7-tetrachloro-3,3-bis[2-[4-dimethylamino]phenyl]-2-(4-methoxyphenyl)ethenyl]-1(3H)isobenzofuranone;
and crystal violet lactone.

13. The thermally responsive record material according to claim 1 comprising in addition an insulating layer positioned between the heat sensitive composition and the support.

14. The thermally responsive record material according to claim 1 wherein the support comprises paper or film.

15. An improved bar code comprising a thermally responsive record material according to claim 1.

* * * * *